United States Patent
Palmer et al.

(10) Patent No.: US 11,876,404 B2
(45) Date of Patent: Jan. 16, 2024

(54) ELECTRIC MACHINE STRUCTURE AND TECHNOLOGY

(71) Applicants: Bradford Palmer, Ham Lake, MN (US); Codrin Cantemir, Pickerington, OH (US); Cummins Inc., Columbus, IN (US)

(72) Inventors: Bradford Palmer, Ham Lake, MN (US); Codrin Cantemir, Pickerington, OH (US)

(73) Assignee: CUMMINS INC., Columbus, IN (US)

( * ) Notice: Subject to any disclaimer, the term of this patent is extended or adjusted under 35 U.S.C. 154(b) by 300 days.

(21) Appl. No.: 17/285,828

(22) PCT Filed: Oct. 16, 2019

(86) PCT No.: PCT/US2019/056608
§ 371 (c)(1),
(2) Date: Apr. 15, 2021

(87) PCT Pub. No.: WO2020/081736
PCT Pub. Date: Apr. 23, 2020

(65) Prior Publication Data
US 2021/0384780 A1    Dec. 9, 2021

Related U.S. Application Data

(60) Provisional application No. 62/746,224, filed on Oct. 16, 2018.

(51) Int. Cl.
*H02K 1/18* (2006.01)
*H02K 1/14* (2006.01)

(52) U.S. Cl.
CPC ............. *H02K 1/187* (2013.01); *H02K 1/146* (2013.01)

(58) Field of Classification Search
CPC .............................. H02K 1/187; H02K 1/146
(Continued)

(56) References Cited

U.S. PATENT DOCUMENTS 4,080,724 A * 3/1978 Gillette .................... H02K 1/06
29/598
8,288,982 B2   10/2012 Kauppi
(Continued)

FOREIGN PATENT DOCUMENTS

CN    103051078 A     4/2013
CN    206180711 U  *  5/2017
(Continued)

OTHER PUBLICATIONS

International Search Report and Written Opinion issued by the ISA/US, Commissioner for Patents, dated Jan. 10, 2020, for International Application No. PCT/US2019/056608; 5 pages.

*Primary Examiner* — Jose A Gonzalez Quinones
(74) *Attorney, Agent, or Firm* — Faegre Drinker Biddle & Reath LLP

(57) ABSTRACT

The electric machine includes a rotor and an internal stator operatively coupled to the rotor. The internal stator further includes a back iron having a bearing and a plurality of teeth, a plurality of ring coils wound around the back iron, a central hub, and a plurality of connectors that connects the central hub to the back iron. The back iron is made of a first material and at least one connector is made of a second material that is different from the first material.

20 Claims, 3 Drawing Sheets

(58) Field of Classification Search
USPC .................................. 310/216.053, 216.091
See application file for complete search history.

(56) References Cited

U.S. PATENT DOCUMENTS

| | | | |
|---|---|---|---|
| 8,754,568 | B2 | 6/2014 | Kim et al. |
| 9,013,081 | B2 | 4/2015 | Atallah et al. |
| 2012/0126740 | A1* | 5/2012 | Kauppi ............... H02P 23/0004 |
| | | | 310/191 |
| 2013/0119809 | A1 | 5/2013 | Levesque |
| 2013/0181571 | A1 | 7/2013 | Chang |
| 2015/0214790 | A1 | 7/2015 | Ballauf et al. |
| 2017/0117784 | A1 | 4/2017 | Guo et al. |
| 2017/0361900 | A1 | 12/2017 | Doerksen et al. |
| 2018/0013323 | A1 | 1/2018 | Woolmer et al. |

FOREIGN PATENT DOCUMENTS

| | | |
|---|---|---|
| JP | 07-184333 A | 7/1995 |
| JP | 10-201145 A | 7/1998 |
| KR | 10-1276633 B1 | 6/2013 |
| WO | 2008/123735 A1 | 10/2008 |
| WO | 2012/009811 A1 | 1/2012 |
| WO | WO-2012009811 A1 * 1/2012 | ............... B62M 7/12 |
| WO | WO-2014179882 A1 * 11/2014 | ............... B60B 1/02 |

* cited by examiner

ELECTRIC MACHINE STRUCTURE AND TECHNOLOGY

RELATED APPLICATIONS

This application is a national stage filing of International Application No. PCT/US2019/056608, filed Oct. 16, 2019, which claims the benefit of U.S. Provisional Patent Application No. 62/746,224, filed Oct. 16, 2018, titled "Electric Machine Structure and Technology", the entire disclosures of which are each hereby expressly incorporated herein by reference in their entirety.

BACKGROUND OF THE DISCLOSURE

Electric machines are utilized in various applications including electric vehicles and engine-generators (e.g., gensets). For example, a drive system of an electric vehicle typically includes an alternating current (AC) electric motor driven by a direct current (DC) power source (e.g., a main battery). The AC electric motor is coupled to the DC power source via a power inverter that performs switching functions to convert the DC power to AC power.

In some instances, the electric machine configuration may involve an external rotor and an internal stator. The stator may be wound with "ring" type coils. For example, an elementary ring coil (also known as toroidal coil) may be formed around a back iron (also known as a yoke) of the internal stator and may be located in one slot only. For comparison, a conventional winding may have an elementary coil located in at least two slots and will not embrace the back iron in any way. Some advantages of a winding with the ring coils include the easiness of reconfigurations (i.e., it can operate with a variety of different numbers of poles and/or phases—the notion of pole pitch does not exist anymore), a good behavior at high frequencies, and a sensible smaller leakage inductance compared to conventional methods. However, such coils may interfere geometrically and electromagnetically with a convention stator structure.

SUMMARY

According to one embodiment, the present disclosure provides an electric machine that includes a rotor and an internal stator operatively coupled to the rotor. The internal stator further includes a back iron having a bearing and a plurality of teeth, a plurality of ring coils wound around the back iron, a central hub, and a plurality of connectors that connects the central hub to the back iron. The back iron is made of a first material and at least one connector is made of a second material that is different from the first material.

In some embodiments, the first material may have high magnetic properties, and the second material may have non-magnetic properties with high electric resistivity.

In some embodiments, the central hub may be made of a third material that is different from the first material and the second material. Additionally, the third material may be a material that offers rigidity and machinability required by the electric machine while being weldable to the second material.

In some embodiments, an interior surface of the central hub may be adjusted to align an axis of the central hub to an axis of an airgap formed between the rotor and the internal stator.

In some embodiments, each of the plurality of coils may be winded around the bearing in a slot between the plurality of teeth.

In some embodiments, at least one of the plurality of connectors may be substantially parallel to a ring coil of the plurality of ring coils.

In some embodiments, the back iron may further include a plurality of tabs, and one of the plurality of connectors may be welded to one of the plurality of tabs.

In some embodiments, the back iron may further include a plurality of tabs, and two connectors of the plurality of connectors may be welded to a single tab of the plurality of tabs.

In some embodiments, a configuration of the plurality of connectors may allow one or more welding equipment to access spaces between the plurality of connectors to weld the plurality of connectors to the central hub and the back iron.

In some embodiments, to connect the central hub to the back iron may include to weld the plurality of connectors to the central hub and the back iron in a single welding operation.

According to another embodiment, the present disclosure provides an electric system that includes a power source, an inverter operatively coupled to the power source, and an electric machine operatively coupled to the inverter. The electric machine further includes a rotor and an internal stator operatively coupled to the rotor. The internal stator includes a back iron having a bearing and a plurality of teeth, a plurality of ring coils wound around the back iron, a central hub, and a plurality of connectors that connects the central hub to the back iron. The back iron is made of a first material and at least one connector is made of a second material that is different from the first material.

In some embodiments, the first material may have high magnetic properties, and the second material may have non-magnetic properties with high electric resistivity.

In some embodiments, the central hub may be made of a third material that is different from the first material and the second material. Additionally, the third material may be a material that offers rigidity and machinability required by the electric machine while being weldable to the second material.

In some embodiments, an interior surface of the central hub may be adjusted to align an axis of the central hub to an axis of an airgap formed between the rotor and the internal stator.

In some embodiments, each of the plurality of coils may be winded around the bearing in a slot between the plurality of teeth.

In some embodiments, at least one of the plurality of connectors may be substantially parallel to a ring coil of the plurality of ring coils.

In some embodiments, the back iron may further include a plurality of tabs, and one of the plurality of connectors may be welded to one of the plurality of tabs.

In some embodiments, the back iron may further include a plurality of tabs, and two connectors of the plurality of connectors may be welded to a single tab of the plurality of tabs.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the disclosure and such exemplifications are not to be construed as limiting the scope of the disclosure in any manner.

DETAILED DESCRIPTION

Figure 1:
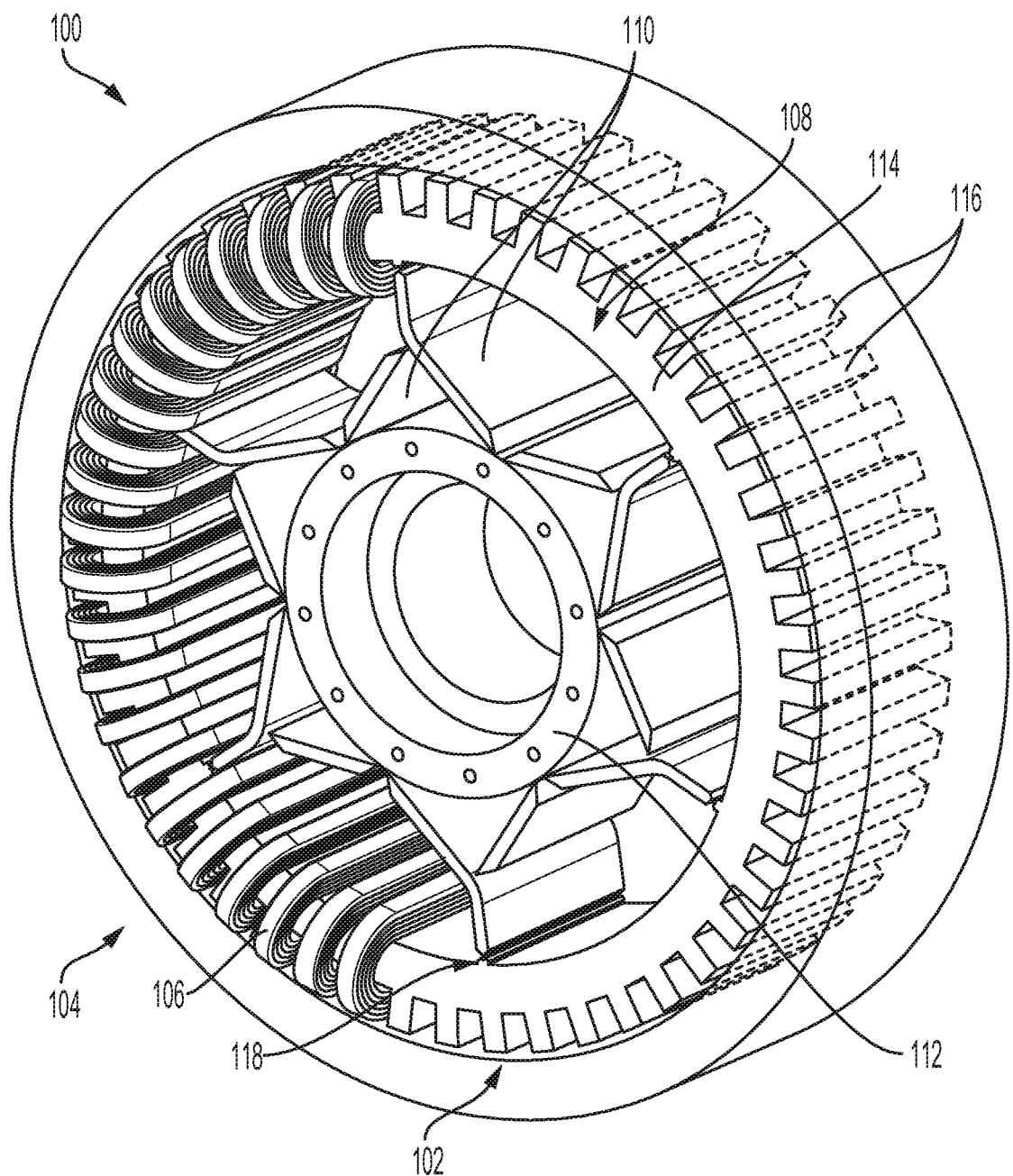
FIG. 1 is a perspective view of an exemplary embodiment of an electric machine.

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings.

The terms "couples," "coupled," and variations thereof are used to include both arrangements wherein two or more components are in direct physical contact and arrangements wherein the two or more components are not in direct contact with each other (e.g., the components are "coupled" via at least a third component), but yet still cooperate or interact with each other.

Throughout the present disclosure and in the claims, numeric terminology, such as first and second, is used in reference to various components or features. Such use is not intended to denote an ordering of the components or features. Rather, numeric terminology is used to assist the reader in identifying the component or features being referenced and should not be narrowly interpreted as providing a specific order of components or features.

A structure of an electric machine from an electric system is described below. For example, the electric machine includes a stator and a rotor. In the present invention, the stator structure permits minimal or no geometric and electromagnetic interface using a ring type winding. Additionally, and/or alternatively, using this structure allows mass production of the electric machine. It should be appreciated that the electric machine of the present invention may be used as part of an electric system of an electric vehicle, an engine-generated vehicle, and/or a plug-in hybrid vehicle.

Referring now to FIG. 1, an exemplary embodiment of an electric machine 100 is shown. The electric machine 100 includes an internal stator 102 and a rotor 104. The rotor 104 is a moving component of the electric machine 100 and may be made of any suitable configuration such as, but not limited to, an induction configuration, permanent magnet (PM) configuration, and salient rotor (SR) configuration. The internal stator 102 is a stationary component of the electric machine 100 and includes multiple ring coils 106. Typically, using the ring coils may interfere geometrically and/or electromagnetically with a conventional stator. However, in the illustrative embodiment, the structure of the internal stator 116 of the electric machine 100 is adapted to avoid such interferences with the ring coils 106. Additionally, as described further below, the internal stator 116 is made of three dissimilar materials: a first material that has high magnetic properties, a second material that has non-magnetic proprieties, and a third material that offers the rigidity and the machinability required by the electric machine 102 while being weldable to the second material.

Figure 2:
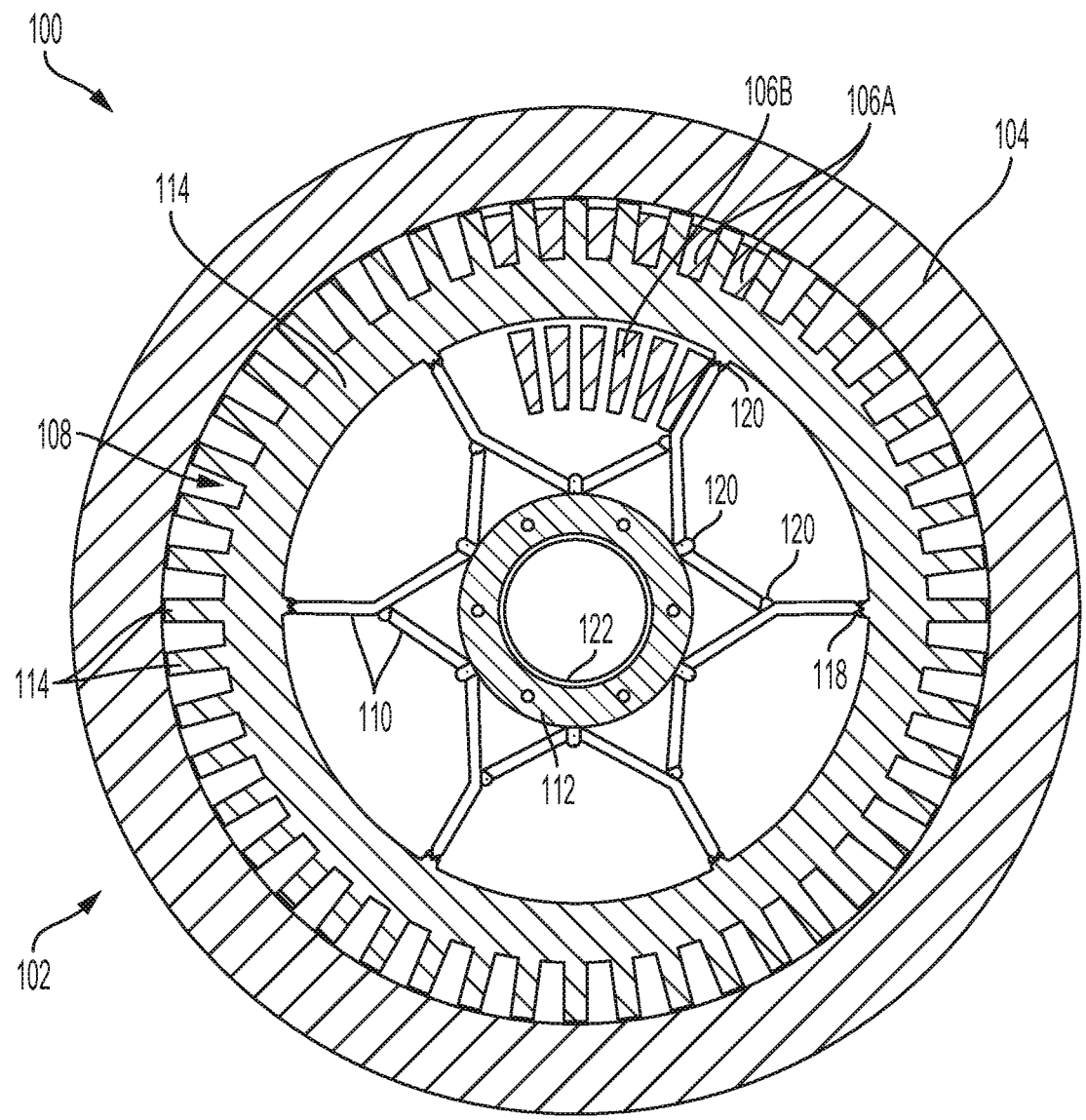
FIG. 2 is a cross-sectional view of the electric machine of FIG. 1.

The internal stator 102 includes a back iron 108, a plurality of ring coils 106 wrapped around the back iron 108, a plurality of connectors (e.g., spokes) 110, and a central hub 112. The back iron 108 further includes a bearing 114 and a plurality of teeth 116. The plurality of ring coils or windings (e.g., toroidal coils) 106 are positioned between the teeth 116. Specifically, the ring coils 106 are coiled around the bearing 114 and between the teeth 116 (e.g., encircling the bearing 114). In other words, instead of the ring coils 106 being coiled around the teeth 116, the ring coils 106 are wrapped around the bearing 114 such that a first section of coils 106 are in-between two of the teeth 116 and a second section of the coils are facing toward the hub 112. Solely for ease of illustration, FIG. 2 shows the ring coils 106 are shown winded only on a fraction of the internal stator 102. In use, the internal stator 102 includes the ring coils 106 around the entire back iron 108 (i.e., between each of the teeth 116). Additionally, the connectors 110 are adapted to support and/or couple the central hub 112 to the back iron 108. More specifically, the connectors 110 are coupled to the bearing 114 of the back iron 108 via a plurality of tabs 118. As described further below, the lengths of the tabs 118 may vary based on the configuration of the connectors 110. The central hub 112 hosts the bearings and the rotor shaft (not shown).

As described above, the components of the internal stator 102 may be made of using different materials. For example, the back iron 108 is made of a first material and the connectors 110 are made of a second material that is different from the first material. In the illustrative embodiment, the electromagnetic interference is minimized or reduced by using two different materials for the back iron 108 and the connectors 110. In some examples, the back iron 108 is made of a material that has high magnetic properties such as, but not limited to, silicon steel, nickel alloys, cobalt alloys, and/or other iron-based alloys. Whereas, the connectors 110 are made of a material that has non-magnetic properties with high electrical resistivity (e.g., stainless steel) to minimize parasitic losses. Additionally, the central hub 112 is made of a third material that is different from the first and second materials of the back iron 108 and the connectors 110, respectively. The central hub 112 may be made of any material (e.g., suitable structural steel or cast iron) that offers the rigidity and the machinability required by the electric machine 100 while being weldable to the second material.

Referring now to FIG. 2, a cross-sectional view of the electric machine 100 of FIG. 1 is shown. As described above, the internal stator 102 includes the back iron 108, the plurality of ring coils 106, the plurality of connectors 110, and the hub 112. The connectors 110 are coupled to the back iron 108 via the tabs 118, and the central hub 112 is coupled to the back iron 108 via the connector 110. Additionally, the active part of the ring coil 106A is positioned between the teeth 116 and the return part of the coil 106B is positioned facing toward the hub 112 between the connectors 110.

It should be appreciated that the structure of the internal stator 102 shown in FIG. 2 (e.g., the configuration of the connectors 110 that operatively couple the back iron 108 to the central hub 112) is appropriate for a high torque electric machine 100, which may be a traction motor with a pole switch variation. Such an electric machine 100 may develop over 10000 Newton Meter (Nm) at start (short time) based on an airgap diameter of 500 millimeter (mm) and a stack length of 200 mm. In this embodiment, an elementary ring coil 106 may have around 40 turns (e.g., AGW14 or equivalent).

During machining or manufacturing process of the electric machine 100, the connectors 110 are welded to the back iron 108 via the tabs 118. For example, the magnetic circuit (e.g., the back iron 108) may be made of a stack of thin e-steel (e.g., around 800 plates for a 200 mm stack). Therefore, the welds 120 on the tab 118 is adapted to keep the stack together. In other words, if the tabs 118 are welded, no other means may be needed to assure the stack assembly and rigidity. It should be appreciated that most of the modern high frequency e-steels (e.g., HF-10X) are formulated on purpose for a good weldability such that assemblies can be performed by regular metal inert gas (MIG) welding, tungsten inert gas (TIG) welding, or arc machines. Additionally, the connectors 110 are welded to the central hub 112, thereby connecting the central hub 112 to the back iron 108.

It should be appreciated that the configuration of the connectors 110 allows one or more welding equipment (e.g., a welding head and/or a robot) to access spaces between the connectors 110 to weld the connectors 110 to the central hub 112 and the back iron 108. For example, multiple welding heads may access the spaces between the connectors 110 to weld the multiple connectors 110 to the central hub 112 and the back iron 108 in a single welding operation (i.e., forming the welds 120 simultaneously). This allows the heat to be applied to the central hub 112 and the back iron 108 evenly such that it will not distort or introduce internal stresses.

Once the welds 120 are formed, the last machining operation to be performed for the electric machine 100 is to machine the internal (e.g., interior) surface 122 of the central hub 112. This may be performed in order to obtain a true coaxially between the axis of the central hub 112 and the axis of airgap formed between the internal stator 102 and the rotor 104. Additionally, and/or alternatively, this may be performed to compensate for an error which may occur in the welding process of the connectors 110.

Figure 3:
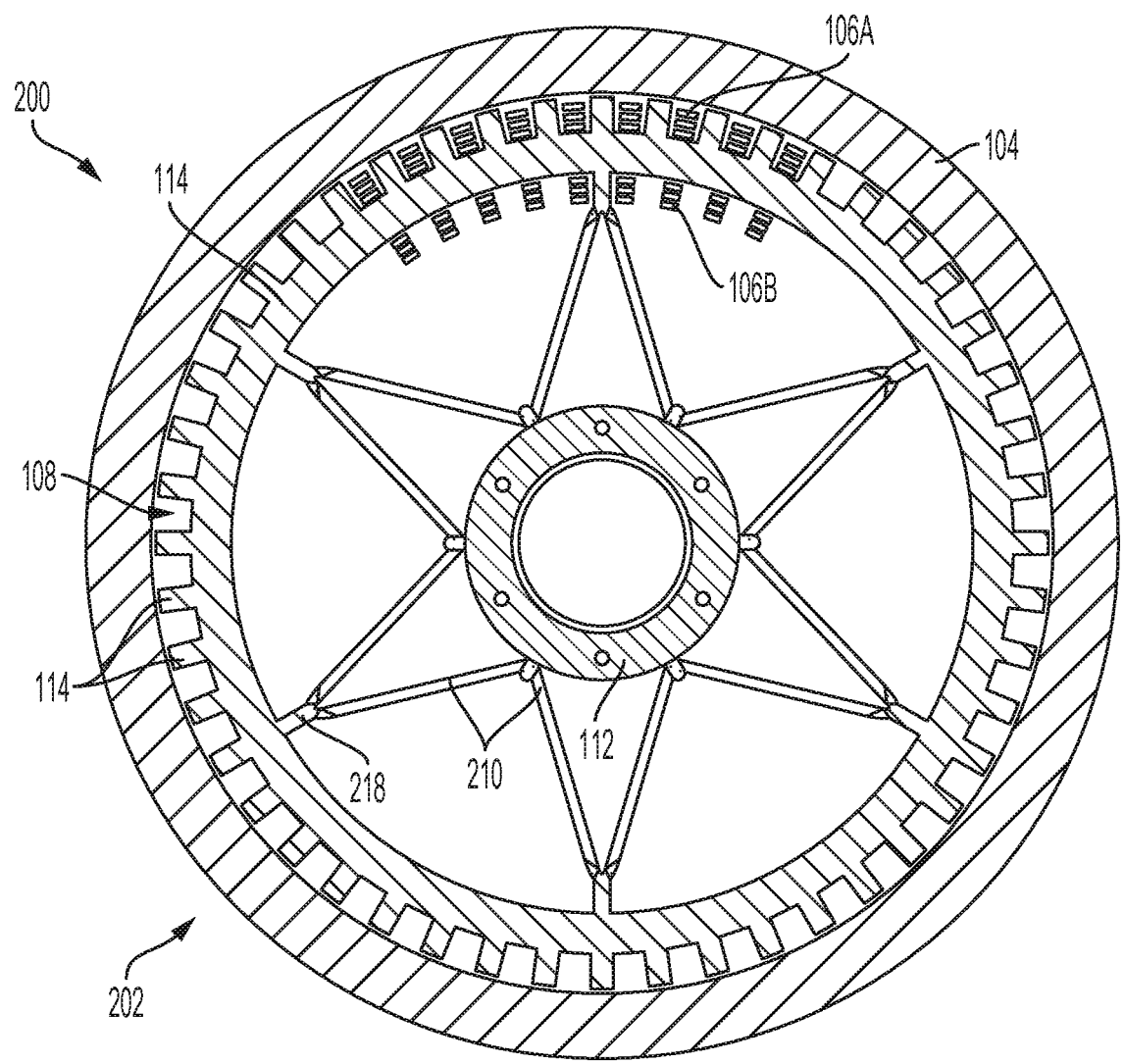
FIG. 3 is a cross-sectional view of another exemplary embodiment of an electric machine.

Referring now to FIG. 3, a cross-sectional view of another embodiment of the electric machine 200 is shown. It should be appreciated that the electric machine 200 is similar to the electric machine 100 of FIGS. 1 and 2. It should also be appreciated that the internal stator 202 is similar to the internal stator 102 of FIGS. 1 and 2 except that the configuration of the connectors and the length of the tabs are different to allow the electric machine 200 to be used in high-frequency applications.

In this embodiment, each tab 218 of the internal stator 202 extends further inwardly toward the hub 112 (i.e., the tab 218 of the internal stator 202 is longer than the tab 118 of the internal stator 102) and is used as an assembly of two substantially symmetric connectors 210. Due to the structure of the connector 210, the coil windings 106 are positioned substantially parallel to a portion of the connectors 210. This causes the coil windings 106 in each slot between the teeth 116 to have a fewer number of turns (e.g., three to four turns) compared to the coil windings of the electric machine 100 shown in FIGS. 1 and 2, thereby reducing a total weight of the electric machine 200 relative to the electric machine 100. It should be appreciated that the coil windings 106 may be made of flat conductors. It should be appreciated that the fewer number of turns and the use of flat conductors as the coil windings 106 may mitigate specific effects generated by high-frequency currents.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. An electric machine comprising:
   a rotor; and
   an internal stator operatively coupled to the rotor, wherein the internal stator includes:
      a back iron having a bearing and a plurality of teeth,
      a plurality of ring coils wound around the back iron,
      a central hub, and
      a plurality of connectors configured to separately connect to the central hub and the back iron, wherein the back iron is made of a first material and at least one connector is made of a second material that is different from the first material.

2. The electric machine of claim 1, wherein the first material has high magnetic properties, and the second material has non-magnetic properties with high electric resistivity.

3. The electric machine of claim 1, wherein the central hub is made of a third material that is different from the first material and the second material.

4. The electric machine of claim 3, wherein the third material is a material that offers rigidity and machinability required by the electric machine while being weldable to the second material.

5. The electric machine of claim 1, wherein an interior surface of the central hub is adjusted to align an axis of the central hub to an axis of an airgap formed between the rotor and the internal stator.

6. The electric machine of claim 1, wherein each of the plurality of coils is winded around the bearing in a slot between the plurality of teeth.

7. The electric machine of claim 1, wherein at least one of the plurality of connectors is substantially parallel to a ring coil of the plurality of ring coils.

8. The electric machine of claim 1, wherein the back iron further includes a plurality of tabs, wherein one of the plurality of connectors is welded to one of the plurality of tabs.

9. The electric machine of claim 1, wherein the back iron further includes a plurality of tabs, wherein two connectors of the plurality of connectors are welded to a single tab of the plurality of tabs.

10. The electric machine of claim 1, wherein a configuration of the plurality of connectors allows one or more welding equipment to access spaces between the plurality of connectors to weld the plurality of connectors to the central hub and the back iron.

11. The electric machine of claim 1, wherein to connect the central hub to the back iron comprises to weld the plurality of connectors to the central hub and the back iron in a single welding operation.

12. An electric system comprising:
a power source;
an inverter operatively coupled to the power source; and
an electric machine operatively coupled to the inverter, wherein the electric machine further comprises:
a rotor; and
an internal stator operatively coupled to the rotor, wherein the internal stator includes:
a back iron having a bearing and a plurality of teeth,
a plurality of ring coils wound around the back iron,
a central hub, and
a plurality of connectors configured to separately connect to the central hub and the back iron,
wherein the back iron is made of a first material and at least one connector is made of a second material that is different from the first material.

13. The electric system of claim 12, wherein the first material has high magnetic properties, and the second material has non-magnetic properties with high electric resistivity.

14. The electric system of claim 12, wherein the central hub is made of a third material that is different from the first material and the second material.

15. The electric system of claim 14, wherein the third material is a material that offers rigidity and machinability required by the electric machine while being weldable to the second material.

16. The electric system of claim 12, wherein an interior surface of the central hub is adjusted to align an axis of the central hub to an axis of an airgap formed between the rotor and the internal stator.

17. The electric system of claim 12, wherein each of the plurality of coils is winded around the bearing in a slot between the plurality of teeth.

18. The electric system of claim 12, wherein at least one of the plurality of connectors is substantially parallel to a ring coil of the plurality of ring coils.

19. The electric system of claim 12, wherein the back iron further includes a plurality of tabs, wherein one of the plurality of connectors is welded to one of the plurality of tabs.

20. The electric system of claim 12, wherein the back iron further includes a plurality of tabs, wherein two connectors of the plurality of connectors are welded to a single tab of the plurality of tabs.

* * * * *